US012732904B2

(12) United States Patent
Huang et al.

(10) Patent No.: US 12,732,904 B2
(45) Date of Patent: Sep. 8, 2026

(54) SYSTEMS AND METHODS FOR WIRELINE ACCESS TO A WIRELESS CORE NETWORK

(71) Applicant: Verizon Patent and Licensing Inc., Basking Ridge, NJ (US)

(72) Inventors: Chien-Yuan Huang, Basking Ridge, NJ (US); Glenda T. Baloto, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 282 days.

(21) Appl. No.: 18/664,388

(22) Filed: May 15, 2024

(65) Prior Publication Data

US 2025/0358723 A1 Nov. 20, 2025

(51) Int. Cl.

*H04W 88/16* (2009.01)
*H04W 12/06* (2021.01)
*H04W 48/18* (2009.01)

(52) U.S. Cl.

CPC ........... *H04W 48/18* (2013.01); *H04W 12/06* (2013.01); *H04W 88/16* (2013.01)

(58) Field of Classification Search

CPC ..... H04W 48/18; H04W 12/06; H04W 88/16; H04W 60/04; H04W 4/029; H04W 4/90; H04W 4/02; H04W 24/10; H04W 72/23; H04W 72/0446; H04W 72/20; H04W 36/0072; H04W 72/1268; H04W 8/02;

(Continued)

(56) References Cited

U.S. PATENT DOCUMENTS

2005/0026646 A1* 2/2005 Naim .................... H04W 92/12 455/552.1
2008/0219218 A1* 9/2008 Rydnell ................ H04W 92/02 370/331

(Continued)

OTHER PUBLICATIONS

"SD-420 R3 5G Fixed Mobile Convergence Study", The Broadband Forum: 3GPP Draft; SD-420R3, 3rd Generation Partnership Project (3GPP), Mobile Competence Centre; 650, Route Deslucioles; F-06921 Sophia-Antipolis Cedex; France, Nov. 16, 2018, retrieved from the internet: URL:http://www.3gpp.org/ftp/Meetings%5F3GPP%5FSYNC/SA2/Docs/S2%2D1811672%2Ezip [retrieved on Nov. 16, 2018] 7. Interworking scenario.

(Continued)

*Primary Examiner* — Nimesh Patel

(57) ABSTRACT

A device may securely obtain access to a wireless core network, and may identify a particular endpoint associated with a particular physical interface of a plurality of physical interfaces of the device. The device may request a communication session with the particular endpoint via the wireless core network. The device may receive, via the particular physical interface, a first plurality of analog signals, generate first Internet Protocol ("IP") traffic based on the first plurality of analog signals received via the particular physical interface, and output the first IP traffic to the particular endpoint via the wireless core network. The device may receive second IP traffic from the particular endpoint via the wireless core network, generate a second plurality of analog signals based on the second IP traffic received from the particular endpoint via the wireless core network, and output the second plurality of analog signals via the particular physical interface.

20 Claims, 10 Drawing Sheets

(58) Field of Classification Search
CPC ............. H04W 8/12; H04W 36/00698; H04W 36/0027; H04W 24/02; H04W 84/045; H04W 88/06; H04W 36/18; H04W 48/02; H04W 92/12; H04W 36/0066; H04W 72/00; H04W 84/18; H04W 92/02; H04W 12/08; H04W 48/20; H04W 8/08; H04W 88/10; H04W 16/18; H04W 92/20; H04W 92/14; H04W 92/06; H04W 92/045; H04W 88/182; H04W 88/14; H04W 36/00226; H04W 72/04; H04W 72/0453; H04W 16/10; H04W 28/00; H04W 28/0247; H04W 28/0268; H04W 28/0289; H04W 28/0861; H04W 28/0992; H04W 56/001; H04W 76/16; H04W 48/16; H04W 8/24; H04W 72/02; H04W 36/0033; H04W 28/0967; H04W 84/00; H04W 72/27; H04W 80/04; H04W 88/08; H04W 88/12; H04W 92/04; H04L 12/2898; H04L 5/0053; H04L 12/66; H04L 5/001; H04L 5/0055; H04L 65/1016; H04L 65/1083; H04L 41/0895; H04L 27/00; H04L 41/0894; H04L 5/0035; H04L 65/1033; H04L 65/65; H04L 9/40; H04L 12/2856; H04L 12/4637; H04L 2012/6472; H04L 2012/5667; H04L 65/75; H04L 65/1063; H04L 5/0048; H04L 1/1854; H04L 65/1023; H04L 41/40; H04L 47/78; H04L 41/08; H04L 41/16; H04L 45/85; H04L 47/125; H04L 63/0272; H04L 63/10; H04B 7/18519; H04B 7/0452; H04B 7/0628; H04B 17/309; H04B 7/0413; H04B 7/0632; H04B 7/0479; H04B 7/06952; Y02D 30/70; G06F 12/0813; G06F 12/0824; G06F 12/109; G06F 12/128; G06F 2212/1016; G06F 2212/657; G06F 15/16; G06N 10/40; G06N 10/20; G06N 3/045; G06N 3/08; H04M 7/0069; H04M 11/062; H04M 1/72412; H04M 2207/20; H04M 2250/02; H04M 2250/06; H04M 3/2209; H04M 3/2227; H04M 3/4228; H04M 7/006; H04J 11/0056; H04J 11/00
See application file for complete search history.

(56) References Cited

U.S. PATENT DOCUMENTS

| | | | | |
|---|---|---|---|---|
| 2012/0264466 | A1* | 10/2012 | Vainola ................. | H04W 48/18<br>455/500 |
| 2013/0230021 | A1* | 9/2013 | Zuniga .................. | H04W 76/12<br>370/328 |
| 2019/0261445 | A1* | 8/2019 | Bhatnagar ........... | H04W 12/069 |
| 2021/0195690 | A1* | 6/2021 | Agarwal ............... | H04W 88/16 |
| 2022/0006810 | A1 | 1/2022 | Peng et al. | |
| 2022/0116788 | A1 | 4/2022 | Tang et al. | |
| 2024/0373334 | A1* | 11/2024 | Ueura ................... | H04W 48/18 |

OTHER PUBLICATIONS

Third Generation Partnership Project, "Technical Specification Group Services and System Aspects; Study on Non-Seamless WLAN Offload (NSWO) in 5G System (5GS) using 3GPP credentials (Release 17)," 3GPP TR 33.881 V17.1.0 (Mar. 2022).
Third Generation Partnership Project, "Technical Specification Group Core Network and Terminals; Technical Specification Group Services and System Aspects; 3GPP System Architecture Evolution (SAE); Security aspects of non-3GPP accesses (Release 18)," 3GPP TS 33.402 V18.0.0 (Mar. 2023).
Third Generation Partnership Project, "Technical Specification Group Services and System Aspects; Architecture Enhancements for Non-3GPP Accesses (Release 18)," 3GPP TS 23.402 V18.3.0 (Dec. 2023).
Third Generation Partnership Project, "Technical Specification Group Services and System Aspects; Security Architecture and Procedures for 5G system (Release 18)," 3GPP TS 33.501 V18.3.0 (Sep. 2023).

* cited by examiner

SYSTEMS AND METHODS FOR WIRELINE ACCESS TO A WIRELESS CORE NETWORK

BACKGROUND

Wireless networks provide wireless connectivity to User Equipment ("UEs"), such as mobile telephones, tablets, Internet of Things ("IoT") devices, Machine-to-Machine ("M2M") devices, or the like. UEs may use Internet Protocol ("IP")-based messaging to communicate with other UEs, application servers, other networks, etc. via a core of a wireless network. Wired networks, such as a public switched telephone network ("PSTN"), may provide wired connectivity to devices such as landline (e.g., wireline) phones, fax machines, or the like. Such devices may utilize non-IP based messaging, such as Signaling System 7 ("SS7") messaging, to communicate with other devices via the PSTN. The PSTN and the wireless network may each be associated with different respective core networks that provide for connectivity with other devices or networks.

DETAILED DESCRIPTION OF EXAMPLE EMBODIMENTS

The following detailed description refers to the accompanying drawings. The same reference numbers in different drawings may identify the same or similar elements.

Embodiments described herein provide for access to a core of a wireless network by wireline devices, non-IP devices, and/or other devices that do not necessarily have the native capability to communicate with or connect to the wireless network. Such devices may include, for example, landline telephones (e.g., wired telephones), fax machines, or the like. The core of the wireless network may provide services such as routing (e.g., routing voice traffic), call setup or other call control features, access control, etc. The use of the wireless core may eliminate the need for a separate wireline core that handles SS7 signaling, wireline call routing, etc. As such, the deployment of networks may be simplified, thus reducing the complexity and cost of deploying separate networks to handle wireline devices and wireless devices such as UEs. Further, facilitating access for wireline devices to the wireless core network may allow for wireline devices to continue to be used in scenarios where a wireline core (e.g., associated with a PSTN or other suitable wireline network) is deprecated, removed, etc.

Figure 1:
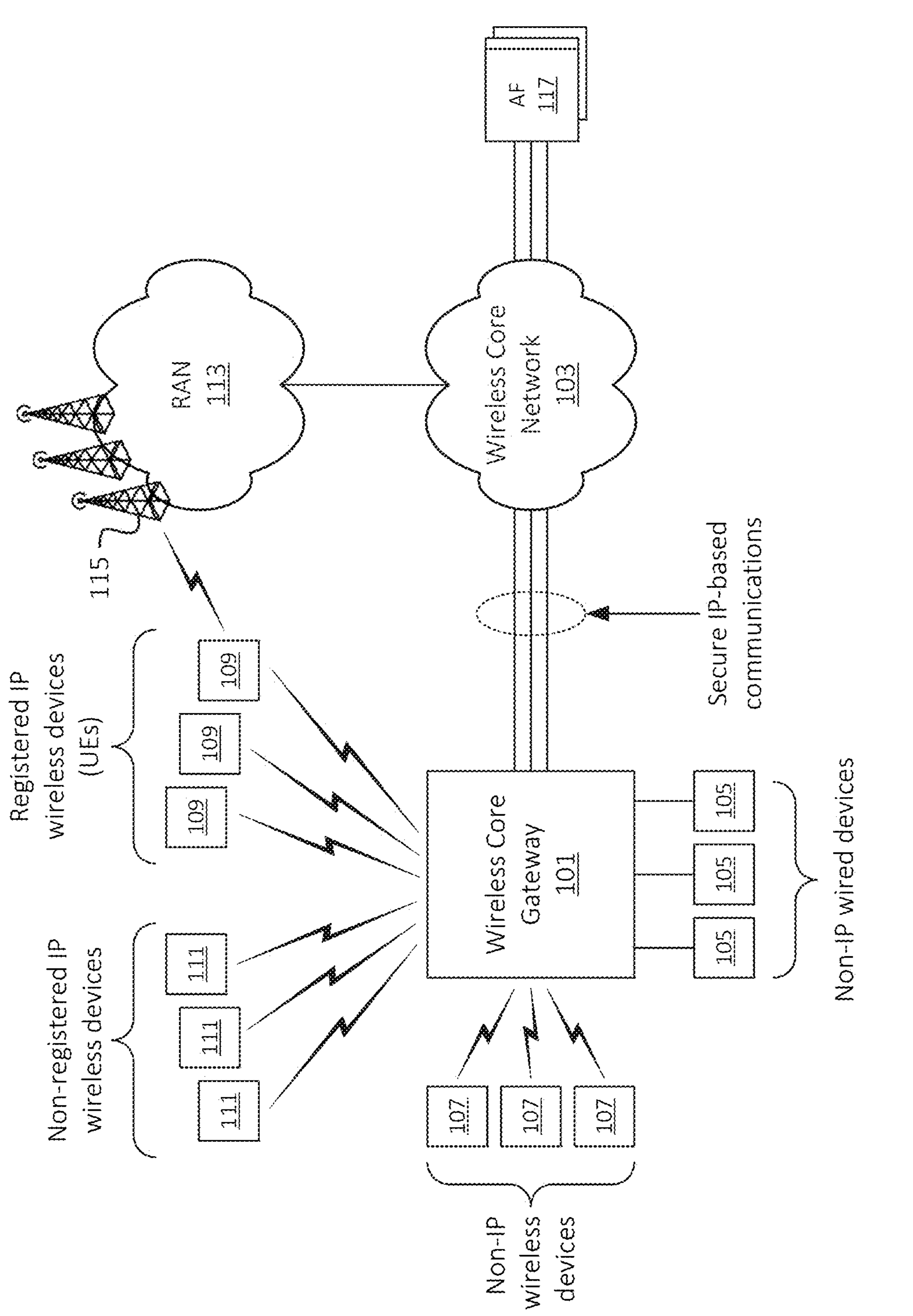
FIG. 1 illustrates an example overview of one or more embodiments described herein.

As discussed herein, a Wireless Core Gateway ("WCG") may be deployed to facilitate connectivity between wireline devices, such as landline phones, fax machines, etc. and a core of a wireless network (e.g., a Fifth Generation core ("5GC") of a Fifth Generation ("5G") wireless network, an Evolved Packet Core ("EPC") of a Long-Term Evolution ("LTE") wireless network, etc.). For example, as shown in FIG. 1, WCG 101 may be communicatively coupled to wireless core network 103 via one or more secure IP-based communication sessions. Such IP-based communication sessions may include, in some embodiments, IP Security ("IPSec") tunnels or other suitable communication sessions. As discussed herein, wireless core network 103 may authenticate WCG 101 to verify that WCG 101 is authorized to provide connectivity to wireless core network 103 (e.g., is not an unauthorized or "rogue" device), thus maintaining security of the network.

As noted above, WCG 101 may facilitate connectivity between non-IP devices, such as non-IP wired devices 105 and/or non-IP wireless devices 107, and wireless core network 103. Non-IP wired devices 105 may connect to WCG 101 via physical ports, such as Registered Jack 11 ("RJ11") ports, ⅛-inch audio jacks, 3.5-millimeter jacks, 2.5-millimeter jacks, Radio Corporation of America ("RCA") jacks, High-Definition Multimedia Interface ("HDMI") jacks, optical jacks, or the like. Non-IP wireless devices 107 may communicate with WCG 101 via a wireless interface, such as a BlueTooth® interface, a Near Field Communication ("NFC") interface, or the like.

In some embodiments, WCG 101 may also provide connectivity between wireless core network 103 and one or more IP-based devices, such as registered IP wireless devices 109 (also referred to as User Equipment ("UEs") 109) and non-registered IP wireless devices 111. Registered IP wireless devices (e.g., UEs) 109 may be registered or provisioned with wireless core network 103. For example, UEs 109 may maintain one or more identifiers and/or may implement one or more authentication and/or control mechanisms (e.g., Radio Resource Control ("RRC") signaling, Non-Access Stratum ("NAS") signaling, etc.) with wireless core network 103. UEs 109 may, for example, receive or maintain a Subscription Permanent Identifier ("SUPI"), a Globally Unique Temporary Identifier ("GUTI"), a Subscription Concealed Identifier ("SUCI"), an International Mobile Station Equipment Identity ("IMEI"), an International Mobile Subscriber Identity ("IMSI"), etc., via which UEs 109 are able to receive connectivity to wireless core network 103 via mechanisms other than WCG 101. For example, UEs 109 may wirelessly communicate (e.g., using a licensed wireless radio access technology ("RAT"), such as a 5G RAT, an LTE RAT, etc.) with wireless core network 103 via RAN 113 (e.g., via one or more base stations 115 of RAN 113, such as one or more Next Generation Nodes B ("gNBs"), evolved Node Bs ("eNBs"), etc.). In some embodiments, WCG 101 may implement one or more licensed RATs (e.g., a 5G RAT, an LTE RAT, etc.) via which WCG 101 communicates with UEs 109. Additionally, or alternatively, WCG 101 may communicate with UEs 109 via an unlicensed wireless interface (e.g., a WiFi interface). In some embodiments, UEs 109 may be dual connectivity ("DC") UEs that are capable of communicating with WCG 101 and RAN 113 simultaneously (e.g., via a WiFi interface and via a licensed RAT, respectively).

Non-registered IP wireless devices 111 may include devices that are not registered with wireless core network 103, and/or that do not implement one or more authentication or access mechanisms associated with wireless network 103. For example, non-registered IP wireless devices 111 may not maintain, and/or may otherwise not utilize, a SUPI, SUCI, IMEI, IMSI, etc. Additionally, or alternatively, non-registered IP wireless devices 111 may not implement, or may otherwise not utilize, particular signaling protocols that are implemented by wireless core network 103 and/or RAN 113 (e.g., RRC signaling, NAS signaling, etc.). Additionally, or alternatively, non-registered IP wireless devices 111 may not implement, or may otherwise not utilize, one or more RATs implemented by RAN 113 (e.g., a 5G RAT, an LTE RAT, etc.). Non-registered IP wireless devices 111 may include, for example, Internet of Things ("IoT") devices, smart home devices, tablets, workstation computers, gaming consoles, or the like. In some embodiments, WCG 101 may also provide connectivity between wireless core network 103 and one or more other types of devices, such as a wired non-registered IP wireless device (e.g., which may connect to WCG 101 via an Ethernet jack, an RJ45 jack, a Multimedia over Coax Alliance ("MoCA") jack, etc.).

As such, WCG 101 may provide connectivity between wireless core network 103 and a wide variety of devices, such as wireline devices (e.g., non-IP wired devices 105 and non-IP wireless devices 107), UEs 109, and non-registered IP wireless devices 111. This connectivity may allow such devices to communicate with one or more Application Functions ("AFs") 117 via wireless core network 103. AFs 117 may perform functions such as call routing, call setup or other features, etc. For example, in some embodiments, a particular AF 117 may include a Telephony Application Server ("TAS"), a video or voice conferencing application server, or the like.

Figure 2:
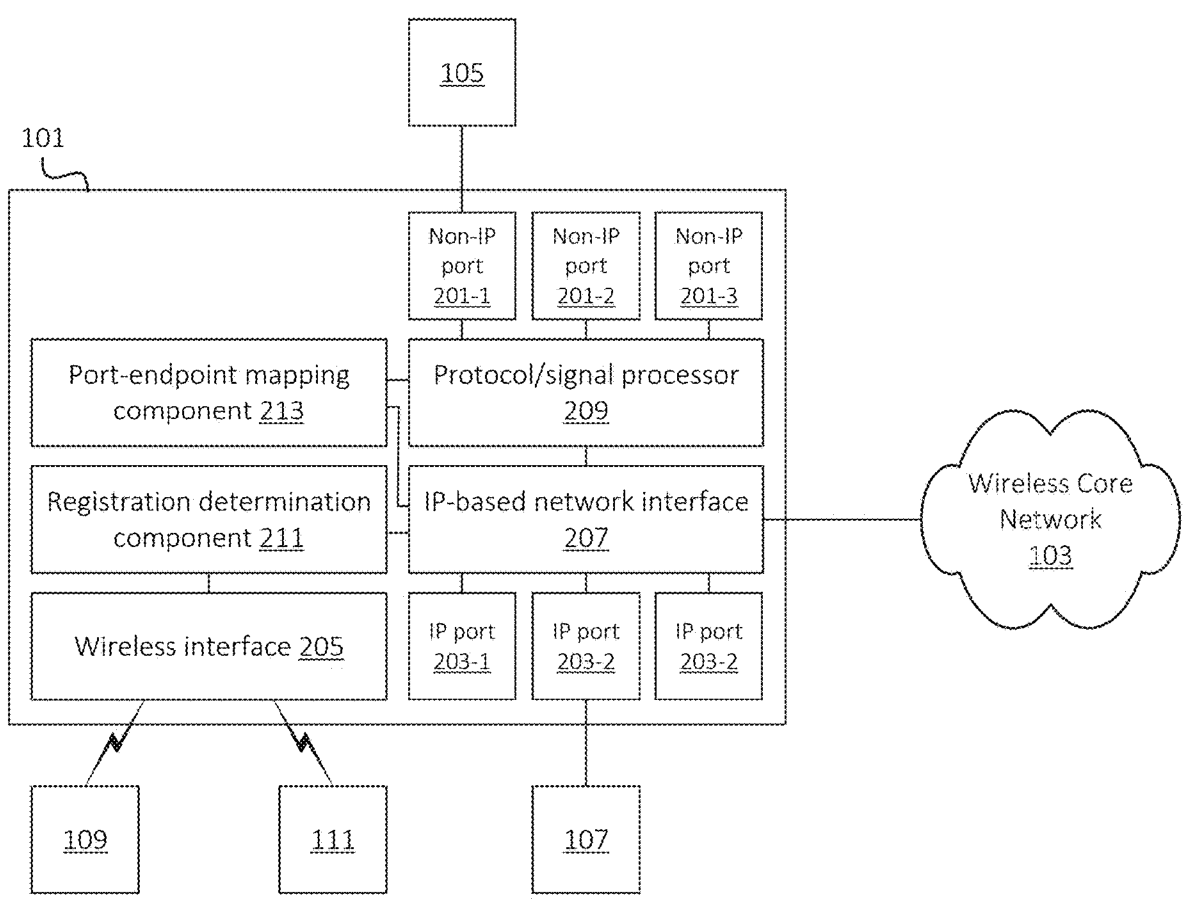
FIG. 2 illustrates example components of one or more devices, in accordance with one or more embodiments described herein.

FIG. 2 illustrates example elements of WCG 101, in some embodiments. As shown, WCG 101 may include one or more non-IP ports 201 (e.g., non-IP ports 201-1, 201-2, and 201-3), one or more IP ports 203 (e.g., IP ports 203-1, 203-2, and 203-3), wireless interface 205, IP-based network interface 207, protocol/signal processor 209, registration determination component 211, and port-endpoint mapping component 213. In some embodiments, WCG 101 may include additional, fewer, different, and/or differently arranged elements. In some embodiments, WCG 101 may include additional or fewer of certain types of elements (e.g., additional or fewer non-IP ports 201 or IP ports 203) than shown in the example of FIG. 2.

Non-IP ports 201 may include ports, interfaces, jacks, etc. that may be used to communicatively couple one or more non-IP wired devices 105 to WCG 101. Non-IP ports 201 may include, for example, RJ11 jacks, audio jacks, video jacks, RCA jacks, HDMI jacks, etc. A particular non-IP port 201 may, for example, be used to send and/or receive streams, data, analog signals, etc. to and/or from a particular non-IP wired device 105. For example, a user may "plug in" a particular non-IP wired device 105 (e.g., a landline telephone) to a particular non-IP port 201-1 (e.g., an RJ11 jack) of WCG 101.

IP ports 203 may include ports, interfaces, jacks, encoders and/or decoders, etc. that may be used to communicatively couple one or more non-IP wireless devices 107 to WCG 101. IP ports 203 may include, for example, Ethernet jacks, RJ45 jacks, MoCA jacks, etc. A particular IP port 203 may, for example, be used to send and/or receive IP traffic (e.g., IP data packets) to and/or from a particular non-IP wireless device 107. For example, a user may "plug in" a particular non-IP wireless device 107 (e.g., a workstation, a tablet computer, an IoT device, etc.) to a particular IP port 203-2 (e.g., an RJ45 jack) of WCG 101.

Wireless interface 205 may include one or more radios, transceivers, etc. that operate according to one or more wireless technologies (e.g., RATs), such as WiFi, Bluetooth®, LTE, 5G, etc. In some embodiments, UEs 109 and/or non-registered IP wireless devices 111 may communicate with WCG 101 via wireless interface 205.

IP-based network interface 207 may include one or more controllers, Network Interface Cards ("NICs"), and/or other suitable interface between WCG 101 and one or more other IP-based devices, such as an IP gateway of wireless core network 103 (e.g., an Evolved Packet Data Gateway ("ePDG")) or other suitable IP-based element of wireless core network 103. In some embodiments, IP-based network interface 207 may implement one or more protocols, authentication mechanisms, etc. via which wireless core network 103 may authenticate WCG 101. For example, IP-based network interface 207 may maintain or provide one or more identifiers or authentication mechanisms, implemented by WCG 101 and wireless core network 103. For example, in some embodiments, IP-based network interface 207 may utilize a SUPI, a GUTI, an IMSI, an IMEI, and/or other suitable identifier or authentication mechanism associated with WCG 101 when communicating with wireless core network 103. In this sense, wireless core network 103 may be able to verify that communications received from WCG 101 are from an authorized source. In some embodiments, IP-based network interface 207 may associate a particular IP address and/or port number with each non-IP port 201, such that IP-based network interface 207 is able to distinguish between incoming traffic (e.g., from wireless core network 103 via IP-based network interface 207) for different non-IP wired devices 105 that are connected to different non-IP ports 201. Similarly, IP-based network interface 207 may associate a particular IP address and/or port number with each IP port 203 and/or with each non-IP wireless device 107, UE 109, and/or non-registered IP wireless device 111.

Protocol/signal processor 209 may maintain or implement one or more protocol stacks, codecs, analog-to-digital and/or digital-to-analog processing mechanisms, queuing mechanisms, Quality of Service ("QoS") mechanisms, etc. Protocol/signal processor 209 may, for example, receive analog signals from non-IP wired device 105 via non-IP port 201-1, and may generate digital information based on the received analog signals using analog-to-digital conversion techniques or other suitable techniques. For example, protocol/signal processor 209 may generate an encoded stream (e.g., using one or more codecs), and generate IP traffic that includes the encoded stream as payload information. Similarly, protocol/signal processor 209 may receive IP traffic (e.g., from wireless core network 103 via IP-based network interface 207) and may generate, reconstruct, extract, etc. an encoded stream that is included in the received IP traffic. In some embodiments, protocol/signal processor 209 may perform further processing, such as digital-to-analog processing, to convert the encoded stream to an analog waveform that may be sent to non-IP wired device 105 via non-IP port 201-1. Additionally, or alternatively, protocol/signal processor 209 may perform some other suitable processing to convert received IP traffic (e.g., an encoded stream or other information included in the IP traffic) to a format that is able to be provided to non-IP wired device 105 via non-IP port 201-1.

Registration determination component 211 may communicate with one or more devices that communicate with WCG 101 via wireless interface 205, and may determine whether such devices are registered with wireless core network 103 and/or are otherwise invoking authentication and/or authorization procedures implemented by wireless network 103. For example, a particular UE 109 may provide (e.g., via wireless interface 205) a Non-Seamless Wireless Local Area Network Offload ("NSWO") indication to WCG 101 and/or some other suitable indication, signifying that UE 109 will utilize such authentication and/or authorization procedures (e.g., using a SUPI, SUCI, etc. associated with UE 109). Registration determination component 211 may implement an application programming interface ("API"), software development kit ("SDK"), or other suitable mechanism by which registration determination component 211 may identify such an indication from UE 109, and may facilitate such procedures (e.g., via IP-based network interface 207) between UE 109 and wireless core network 103. In this manner, in addition to performing authentication and/or authorization procedures with wireless core network 103 based on its own authentication credentials, WCG 101 may also facilitate one or more UEs 109 to access wireless core network 103 via WCG 101 using their own authentication credentials.

Port-endpoint mapping component 213 may maintain an association between particular ports, interfaces, connected devices, etc. of WCG 101 to particular AFs 117, application servers, traffic or service types, QoS parameters, or other attributes. For example, port-endpoint mapping component 213 may maintain information associating a first non-IP port 201 (e.g., non-IP port 201-1) with a first AF 117 (e.g., a TAS), a second non-IP port 201 (e.g., non-IP port 201-2) with a second AF 117 (e.g., a content streaming server), or the like.

As another example, port-endpoint mapping component 213 may maintain information associating a first non-IP port 201 (e.g., non-IP port 201-1) with a first set of QOS parameters (e.g., a "low-latency" set of QoS parameters), may maintain information associating a second non-IP port 201 (e.g., non-IP port 201-2) with a second set of QOS parameters (e.g., a "best effort" set of QoS parameters), or the like. IP-based network interface 207 may utilize such QoS parameters when scheduling, queueing, prioritizing, etc. IP traffic to be sent to wireless network 103. Additionally, or alternatively, IP-based network interface 207 may utilize such QoS parameters to mark traffic (e.g., with Differentiated Services Code Point ("DSCP") values or other suitable values associated with respective QoS parameters).

In some embodiments, port-endpoint mapping component 213 may maintain information associating particular endpoints with particular protocols, codecs, QoS parameters, APIs, etc. For example, a first endpoint may implement a first set of codecs, while a second endpoint may implement a second set of codecs. When performing signal and/or protocol processing for communications with a particular endpoint, protocol/signal processor 209 may utilize a particular codec with which the particular endpoint is associated (e.g., may generate traffic associated with the particular codec when forwarding such traffic to the endpoint, and may utilize the codec to generate analog data or otherwise decode traffic received from the endpoint).

In some embodiments, multiple ports, interfaces, connected devices, etc. may be associated with the same AF 117, endpoint, etc. For example, in one example scenario, a first non-IP port 201, a second non-IP port 201, a third non-IP port 201, a fourth non-IP port 201, etc. may be associated with the same AF 117. In such a scenario, the first non-IP port 201 may be connected to a first non-IP wired device 105, such as a microphone, the second non-IP port 201 may be connected to a second non-IP wired device 105, such as a camera, the third non-IP port 201 may be connected to a third non-IP wired device 105, such as a speaker, and the fourth non-IP port 201 may be connected to a fourth non-IP wired device 105, such as a monitor. The microphone may be used to capture audio (e.g., a user's voice), the camera may be used to capture video (e.g., a user's face), the speaker may be used to play back audio (e.g., another conference participant's voice), and the monitor may be used to play back video (e.g., another conference participant's face). In such a scenario, protocol/signal processor 209 may be configured to perform signal processing, transcoding, analog-to-digital and/or digital-to-analog conversion, etc. to generate one or more encoded streams for uplink and/or downlink traffic to and/or from wireless core network 103 based on signals received from or sent to the multiple non-IP ports 201. For example, protocol/signal processor 209 may generate a combined audio/video stream based on signals, data, etc. received from multiple non-IP wired devices 105 via multiple non-IP ports 201. Similarly, protocol/signal processor 209 may separate a combined audio/video stream, received via IP-based network interface 207, to separate audio and video streams to provide to multiple non-IP wired devices 105 via non-IP ports 201.

In some embodiments, a user of WCG 101 may manually configure port-endpoint mapping component 213 and/or protocol/signal processor 209 to indicate a type of non-IP wired device 105 that is connected to each non-IP port 201, to specify one or more particular endpoints (e.g., AFs 117) and/or traffic types associated with each non-IP port 201, etc. Additionally, or alternatively, protocol/signal processor 209 may automatically detect a type of non-IP wired device 105 connected to one or more non-IP ports 201, and may identify a particular endpoint for such non-IP ports 201 (e.g., based on mapping information received from port-endpoint mapping component 213, where such mapping information associates device types with particular endpoints). Additionally, or alternatively, one or more non-IP ports 201 may be "hard coded" or statically configured to communicate with a given endpoint (e.g., a particular AF 117). In this manner, differentiated services may be provided to different non-IP wired devices 105 that are connected to different non-IP ports 201.

Figure 3:
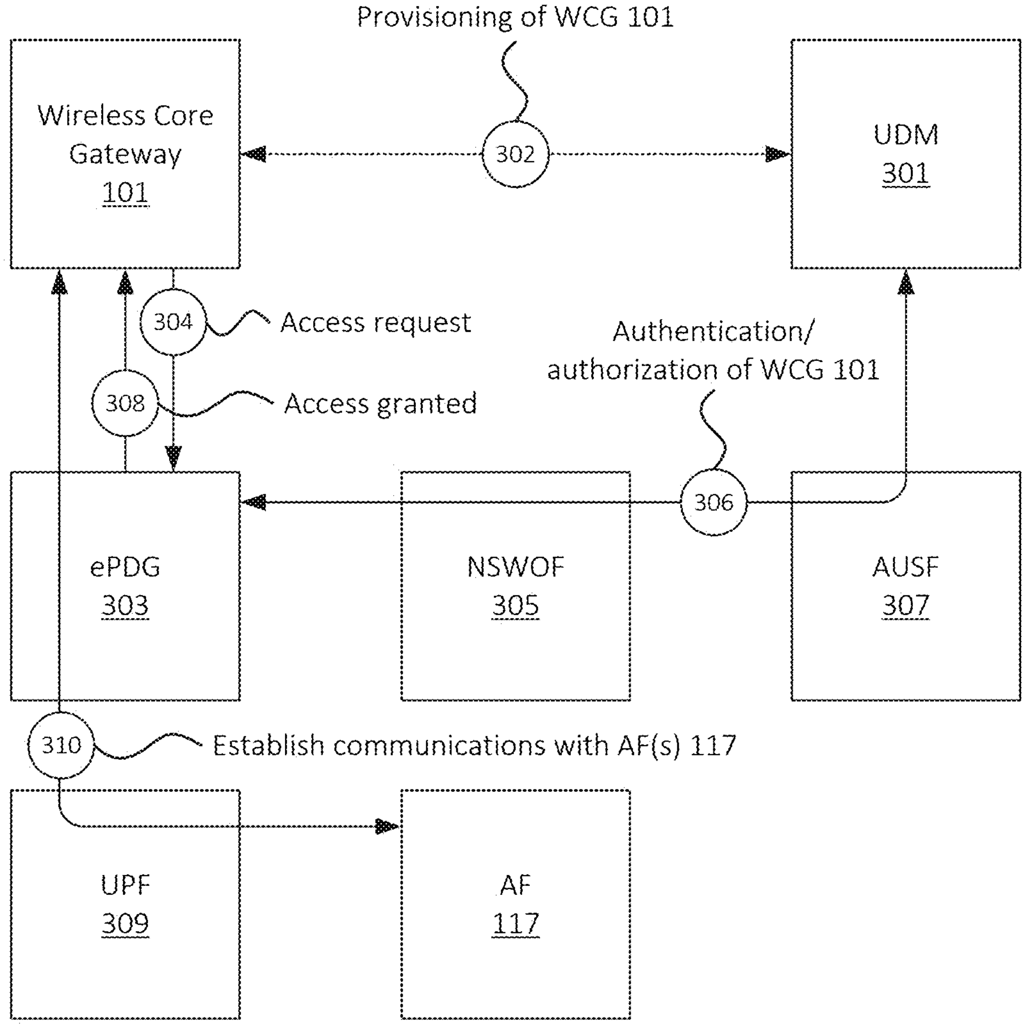
FIG. 3 illustrates an example provisioning of a wireless core gateway device with a wireless core network, in accordance with some embodiments.

FIG. 3 illustrates an example registration and authentication of WCG 101 with wireless core network 103, in accordance with some embodiments. As shown, WCG 101 may be provisioned (at 302) with wireless core network 103, in which WCG 101 is registered with wireless core network 103. Such registration may include associating WCG 101 with one or more network identifiers (e.g., a SUPI, GUTI, etc.), authentication tokens, keys, etc. that may be used by WCG 101 to perform an authentication procedure with wireless core network 103. In some embodiments, provisioning (at 302) WCG 101 may include maintaining, by an information repository of wireless core network 103 (e.g., Unified Data Management function ("UDM") 301, a Unified Data Repository ("UDR"), a Home Subscriber Server ("HSS"), etc.) the network identifier(s) of WCG 101.

At some point after the initial provisioning of WCG 101, WCG 101 may request (at 304) access to wireless core network 103. For example, a user may connect WCG 101 (e.g., via IP-based network interface 207) to a network such as the Internet, a private network, an Optical Network Terminal ("ONT"), or some other suitable network via which WCG 101 is able to communicate with wireless core network 103. Specifically, for example, communications between WCG 101 and wireless core network 103 may include communications between WCG 101 and ePDG 303. WCG 101 may, for example, be configured with an IP address or other suitable communication information based on which WCG 101 may output (at 304) the access request to ePDG 303. Additionally, or alternatively, WCG 101 may communicate with an ePDG discovery server that indicates a particular ePDG (e.g., ePDG 303) to which WCG 101 should output the access request. In some embodiments, the access request may include an identifier of WCG 101 (e.g., SUPI, GUTI, etc.), authentication information (e.g., one or more authentication tokens, keys, or the like), and/or other suitable information.

Based on receiving (at 304) the access request, ePDG 303 may initiate or otherwise participate in an authentication and/or authorization procedure (at 306) on behalf of WCG 101, which may be used to authenticate WCG 101 and verify that WCG 101 is authorized to access wireless core network 103. The authentication and/or authorization procedure may include outputting, by ePDG 303 and to NSWO Function ("NSWOF") 305, an authentication and/or authorization request associated with WCG 101. In some embodiments, WCG 101 may specify NSWOF 305 as an intended recipient for the access request. Such request may include an identifier of WCG 101 (e.g., SUPI, GUTI, etc.), authentication information provided by WCG 101 (e.g., an authentication token, a key, etc.), and/or other suitable information. In some embodiments, ePDG 303 and NSWOF 305 may communicate via an SWa' interface or some other suitable interface. NSWOF 305 may further request authentication and/or authorization of WCG 101 based on the request received from ePDG 303 by outputting a request to an authentication and/or authorization function of wireless core network 103, such as Authentication Server Function ("AUSF") 307, an Authentication, Authorization, Accounting ("AAA") server, or the like. AUSF 307 may authenticate WCG 101 (e.g., based on an authentication token, keys, etc. provided by WCG 101) and/or may verify authorization of WCG 101 to access wireless core network 103. Verifying authorization of WCG 101 to access wireless core network 103 may include querying UDM 301 for information indicating that the identifier(s) of WCG 101 (e.g., SUPI, GUTI, etc.) have been provisioned for access to wireless network 103. Assuming that AUSF 307 determines that WCG 101 is authenticated and is authorized to access wireless network 103, AUSF 307 may indicate successful authentication and authorization of WCG 101 to NSWOF 305, which may indicate the success to ePDG 303. As further shown, ePDG 303 may indicate (at 308) to WCG 101 that access has been granted to WCG 101.

Once WCG 101 receives the indication that access has been granted, WCG 101 may subsequently request, establish, etc. (at 310) one or more communication sessions with one or more AFs 117 via wireless core network 103. For example, WCG 101 may request the establishment of one or more IPSec tunnels between WCG 101 and ePDG 303, such that communications between WCG 101 and wireless core network 103 (e.g., ePDG 303) are encrypted and secure. In some embodiments, such and IPSec tunnel (or tunnels) may be established as part of, or prior to, WCG 101 requesting (at 304) access to wireless core network 103. WCG 101 may request the establishment of one or more protocol data unit ("PDU") sessions between WCG 101 and wireless core network 103, such as between WCG 101 and User Plane Function ("UPF") 309, a Packet Data Network Gateway ("PGW"), or the like. In some embodiments, an IPSec tunnel between WCG 101 and ePDG 303 may include, encapsulate, etc. one or more PDU sessions. In some embodiments, WCG 101 may establish different PDU sessions for communications with different endpoints (e.g., different AFs 117), different QoS parameters, etc.

The traffic sent or received via such PDU sessions (e.g., via ePDG 303 and UPF 309) may include traffic between WCG 101 and one or more AFs 117. In this manner, as noted above, WCG 101 may provide connectivity between such AFs 117 and devices connected to WCG 101 (e.g., non-IP wired devices 105, non-IP wireless devices 107, UEs 109, non-registered IP wireless devices 111, etc.) via wireless core network 103 (e.g., without needing to make use of a wireline core).

Figure 4:
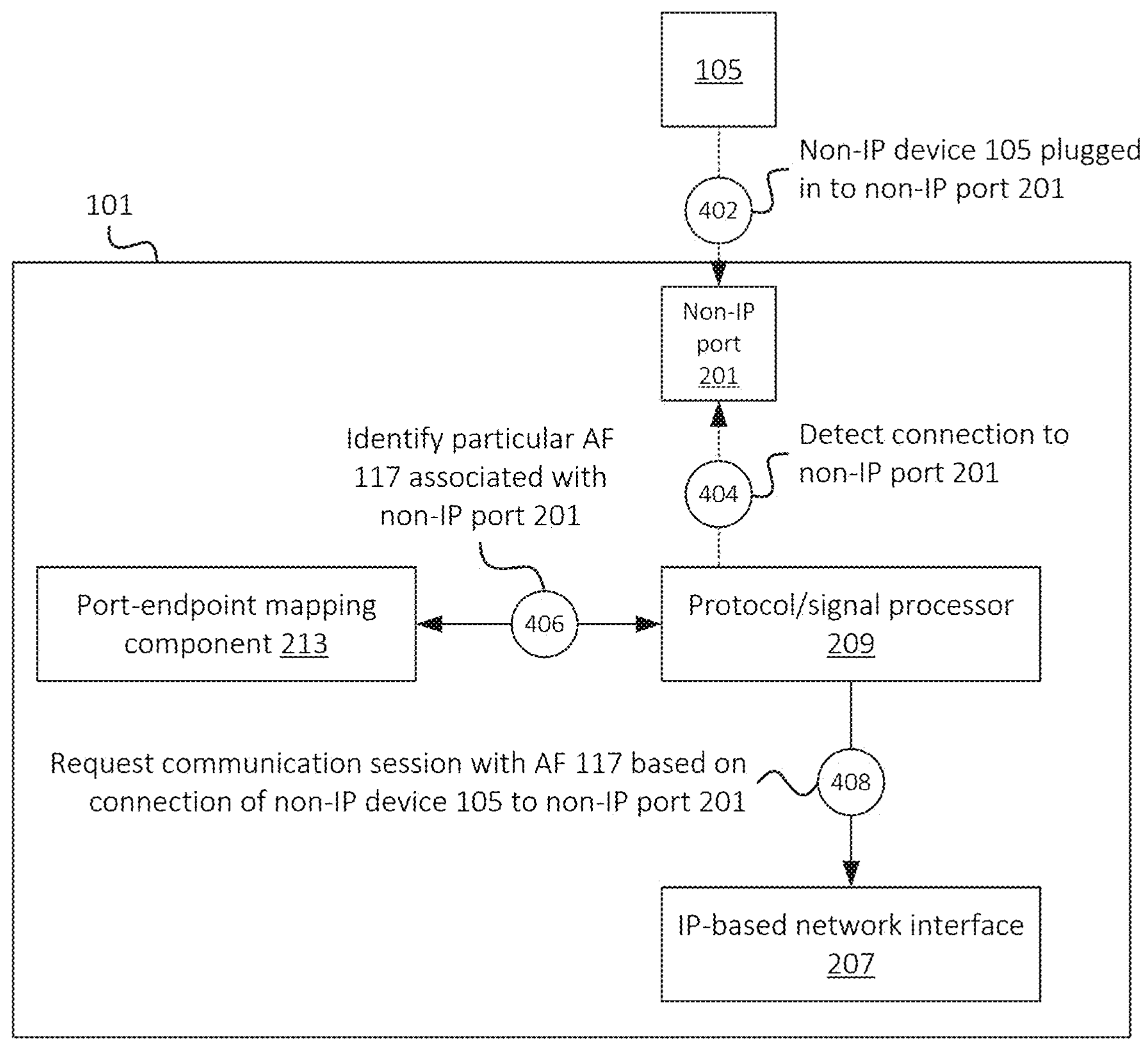
FIGS. 4 and 5 illustrate an example of providing connectivity between a wireless core network and a wireline device, in accordance with some embodiments.

FIG. 4 illustrates an example of WCG 101 establishing connectivity between a particular non-IP wired device 105 and a particular AF 117, in accordance with some embodiments. As shown, a particular non-IP wired device 105 may be installed, connected to, plugged into, etc. (at 402) a particular non-IP port 201 of WCG 101. WCG 101 (e.g., protocol/signal processor 209) may detect (at 404) the connection of non-IP wired device 105 to non-IP port 201. For example, protocol/signal processor 209 may detect an audible noise (e.g., where physically connecting non-IP wired device 105 to non-IP port 201 may cause the occurrence of an audible noise), may detect electrical continuity via non-IP port 201, may receive a request or indication from a user of WCG 101, or may otherwise detect the connection of non-IP wired device 105 to non-IP port 201.

WCG 101 (e.g., protocol/signal processor 209) may further identify (at 406) a particular endpoint (e.g., a particular AF 117) or other parameters (e.g., QoS parameters, scheduling parameters, etc.) associated with non-IP port 201. For example, protocol/signal processor 209 may identify information maintained by port-endpoint mapping component 213, which may include rules, policies, criteria, etc. specifying a particular AF 117 that is associated with non-IP port 201. As one example, if non-IP port 201 includes an RJ11 jack, information received from port-endpoint mapping component 213 may indicate that communications associated with non-IP port 201 are associated with a particular AF 117 (e.g., a particular TAS). Protocol/signal processor 209 may accordingly request, via IP-based network interface 207, the establishment of a communication session with AF 117 based on the connection of non-IP wired device 105 to non-IP port 201. Additionally, or alternatively, protocol/signal processor 209 may indicate to IP-based network interface 207 that a particular non-IP wired device 105 has been connected to non-IP port 201, and IP-based network interface 207 may identify (at 406) the particular AF 117 that is associated with such non-IP port 201. As discussed above, IP-based network interface 207 may output such request to wireless core network 103 via a secure IPSec tunnel between WCG 101 and ePDG 303.

Figure 5:
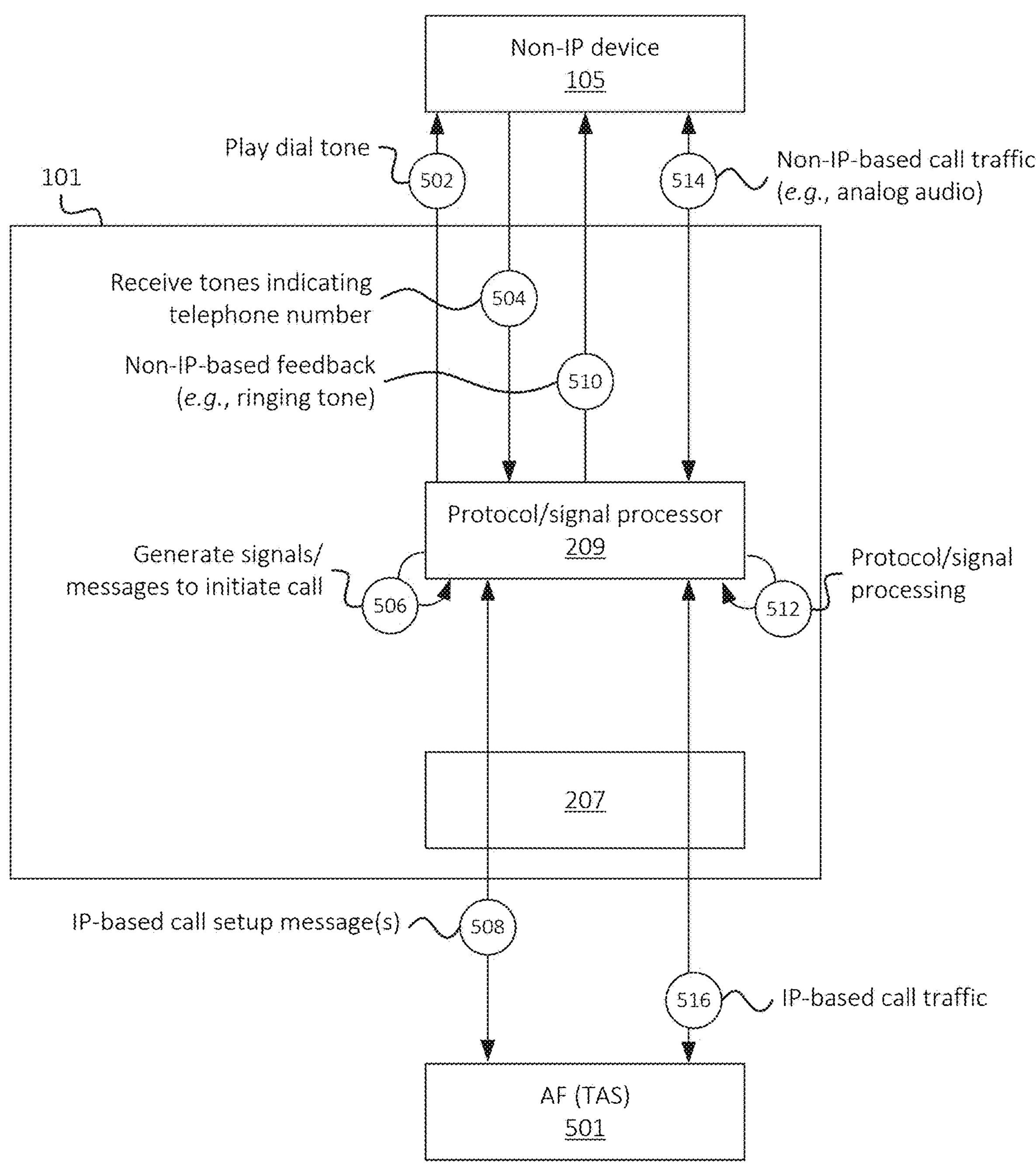

FIG. 5 illustrates example operations to provide connectivity between wireless core network 103 and a particular non-IP wired device 105, such as a landline telephone. In this example, assume that WCG 101 is in communication with a particular AF 117 (e.g., TAS 501). For example, the operations shown in FIG. 4 may have occurred in order for WCG 101 to identify TAS 501 as being associated with non-IP wired device 105 and/or the particular non-IP port 201 to which non-IP wired device 105 is connected. In some embodiments, protocol/signal processor 209 may play (at 502) a dial tone, which may include sending an analog audio signal over non-IP port 201 to non-IP wired device 105.

Protocol/signal processor 209 may play the dial tone continuously, in some embodiments. In some embodiments, protocol/signal processor 209 may play the dial tone based on receiving traffic from AF 501 that includes the dial tone, that includes an instruction to play a dial tone, and/or that indicates that no calls are active with respect to non-IP wired device 105 and/or non-IP port 201.

At some point, WCG 101 (e.g., protocol/signal processor 209) may receive analog audio signals that include tones, such as tones sent by non-IP wired device 105 when a user dials a telephone number via non-IP wired device 105 (e.g., by pressing buttons on a landline phone). Non-IP wired device 105 may perform (at 506) perform analog-to-digital conversion or may otherwise identify the telephone number, and may generate signals and/or messages, such as a Session Initiation Protocol ("SIP") message or other type of message (e.g., in a format that is utilized or implemented by TAS 501) indicating the dialed telephone number. A call setup procedure may be performed (at 508) between WCG 101 (e.g., protocol/signal processor 209 via IP-based network interface 207) and TAS 501, which may include TAS 501 providing feedback (e.g., a "dialing" indication, a "ringing" indication, etc.). Protocol/signal processor 209 may generate and provide (at 510) non-IP-based feedback, such as analog audio depicting a "dialing" tone, a "ringing" tone, etc. Protocol/signal processor 209 may continue to perform (at 512) such processing during the course of the call to facilitate, for example, analog audio being sent (at 514) to non-IP wired device 105 and IP-based traffic (e.g., encoded digital audio information in IP packets) being sent (at 516) to TAS 501. In this manner, non-IP wired device 105 (e.g., a landline telephone) may retain voice call connectivity, while a network operator may be able to achieve core convergence for wireless and wireline devices (e.g., by eliminating the need for a wireline core while still providing connectivity to wireline devices).

Figure 6:
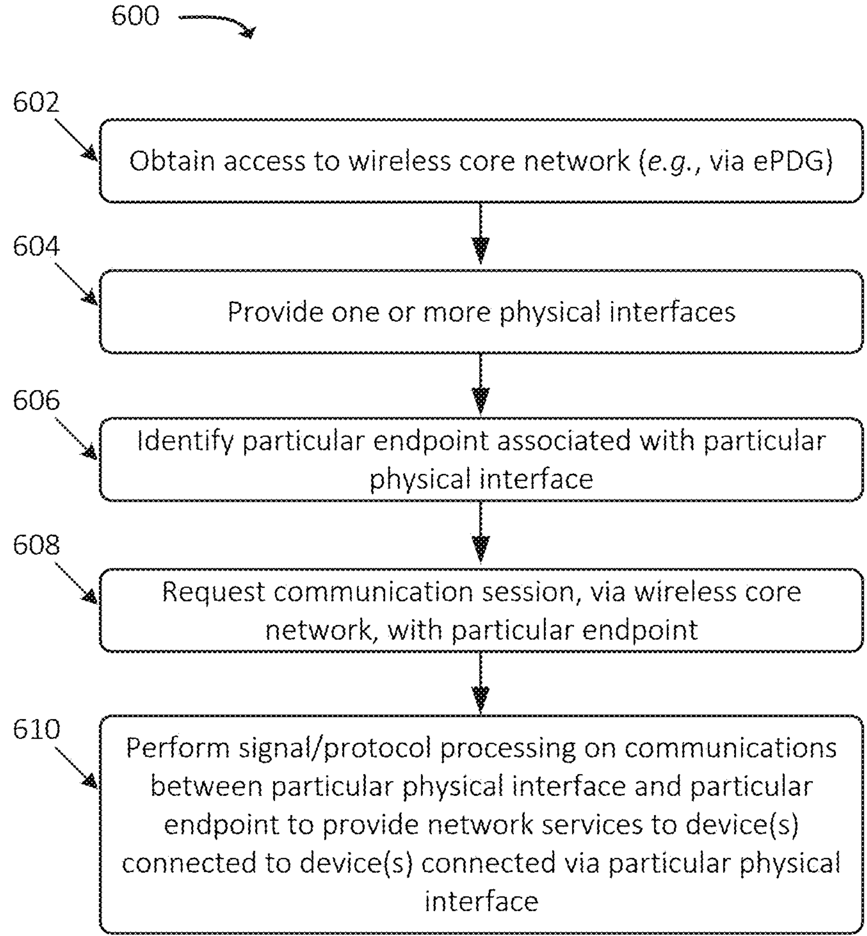
FIG. 6 illustrates an example process for providing access to a wireless core network, in accordance with some embodiments.

FIG. 6 illustrates an example process 600 for providing access to wireless core network 103 by WCG 101. In some embodiments, some or all of process 600 may be performed by WCG 101. In some embodiments, one or more other devices may perform some or all of process 600 in concert with, and/or in lieu of, WCG 101.

As shown, process 600 may include obtaining (at 602) access to wireless core network 103. For example, WCG 101 may have been previously provisioned with wireless core network 103, such that WCG 101 is registered with wireless core network 103. For example, WCG 101 may have received one or more network identifiers (e.g., SUPI, GUTI, etc.), authentication tokens, or the like. Similarly, wireless core network 103 (e.g., UDM 301) may maintain information associating such network identifiers with access privileges, policies, subscription levels, QoS parameters, etc. WCG 101 may request access to wireless core network 103, which may include outputting such request to ePDG 303 of wireless core network 103. As discussed above, in some embodiments, WCG 101 and ePDG 303 may communicate via an IPSec tunnel. In some embodiments, WCG 101 and ePDG 303 may implement an SWu interface or other suitable interface.

As discussed above, ePDG 303 may communicate with one or more other elements of wireless core network 103, such as NSWOF 305, as part of an authentication and/or authorization procedure for WCG 101. In some embodiments, WCG 101 may specify NSWOF 305 as an intended recipient for the access request. In some embodiments, NSWOF 305 may communicate with one or more other elements of wireless core network 103, such as AUSF 307, as part of the authentication and/or authorization procedure for WCG 101. In some embodiments, AUSF 307 may communicate with one or more other elements of wireless core network 103, such as UDM 301, as part of the authentication and/or authorization procedure for WCG 101.

Process 600 may further include providing (at 604) one or more physical interfaces. For example, as discussed above, WCG 101 may include, may provide, etc. one or more physical interfaces, such as non-IP ports 201, via which one or more devices such as non-IP wired devices 105 may connect to WCG 101. In some embodiments, WCG 101 may include one or more other interfaces, such as one or more IP ports 203, via which non-IP wireless devices 107 may connect to WCG 101. In some embodiments, WCG 101 may also include one or more wireless interfaces 205, via which wireless devices (e.g., UEs 109, non-registered IP wireless devices 111, etc.) may connect to WCG 101. As discussed above, non-IP wired devices 105 that are connected to WCG 101 via non-IP ports 201 may lack functionality to communicate via IP-based messaging, and/or may otherwise not communicate via IP-based messaging. For example, non-IP wired devices 105 may include landline phones, fax machines, analog video and/or audio devices, etc. Such non-IP wired devices 105 may be "plugged in" to non-IP ports 201 and/or may otherwise be communicatively coupled to WCG 101 via respective non-IP ports 201.

Process 600 may additionally include identifying (at 606) a particular endpoint associated with a particular physical interface. For example, as discussed above, a user of WCG 101 may specify a particular application server, AF 117, etc. for each non-IP wired device 105 and/or for each non-IP port 201. Additionally, or alternatively, WCG 101 may automatically determine a particular endpoint for a given non-IP wired device 105 or non-IP port 201 (e.g., based on detecting particular attributes or signatures of signals such as analog signals received via non-IP port 201). Additionally, or alternatively, WCG 101 may identify an endpoint associated with a particular physical interface (e.g., non-IP port 201) in some other suitable manner.

Process 600 may also include requesting (at 608) a communication session, via wireless core network 103, to the particular endpoint. For example, WCG 101 may request the establishment of one or more PDU sessions or other types of sessions. In some embodiments, WCG 101 may address or otherwise output the request to a session management element of wireless network 103, such as a Session Management Function ("SMF"), a Serving Gateway ("SGW"), or the like. For example, WCG 101 may output the request to ePDG 303, and ePDG 303 may forward such request to the session management element (e.g., via an S2b interface).

Process 600 may further include performing (at 610) signal and/or protocol processing on communications between the particular physical interface and the particular endpoint in order to provide network services (e.g., as provided by the particular endpoint) to devices connected via the particular physical interface. For example, as discussed above, WCG 101 may perform analog-to-digital processing, digital-to-analog processing, compression, decompression, IP packet formation, etc. (e.g., in accordance with particular codecs, protocols, etc. implemented by the particular endpoint and the particular non-IP port 201 and/or non-IP wired device 105) in order to provide connectivity between non-IP wired device 105 and the particular endpoint via wireless core network 103.

Figure 7:
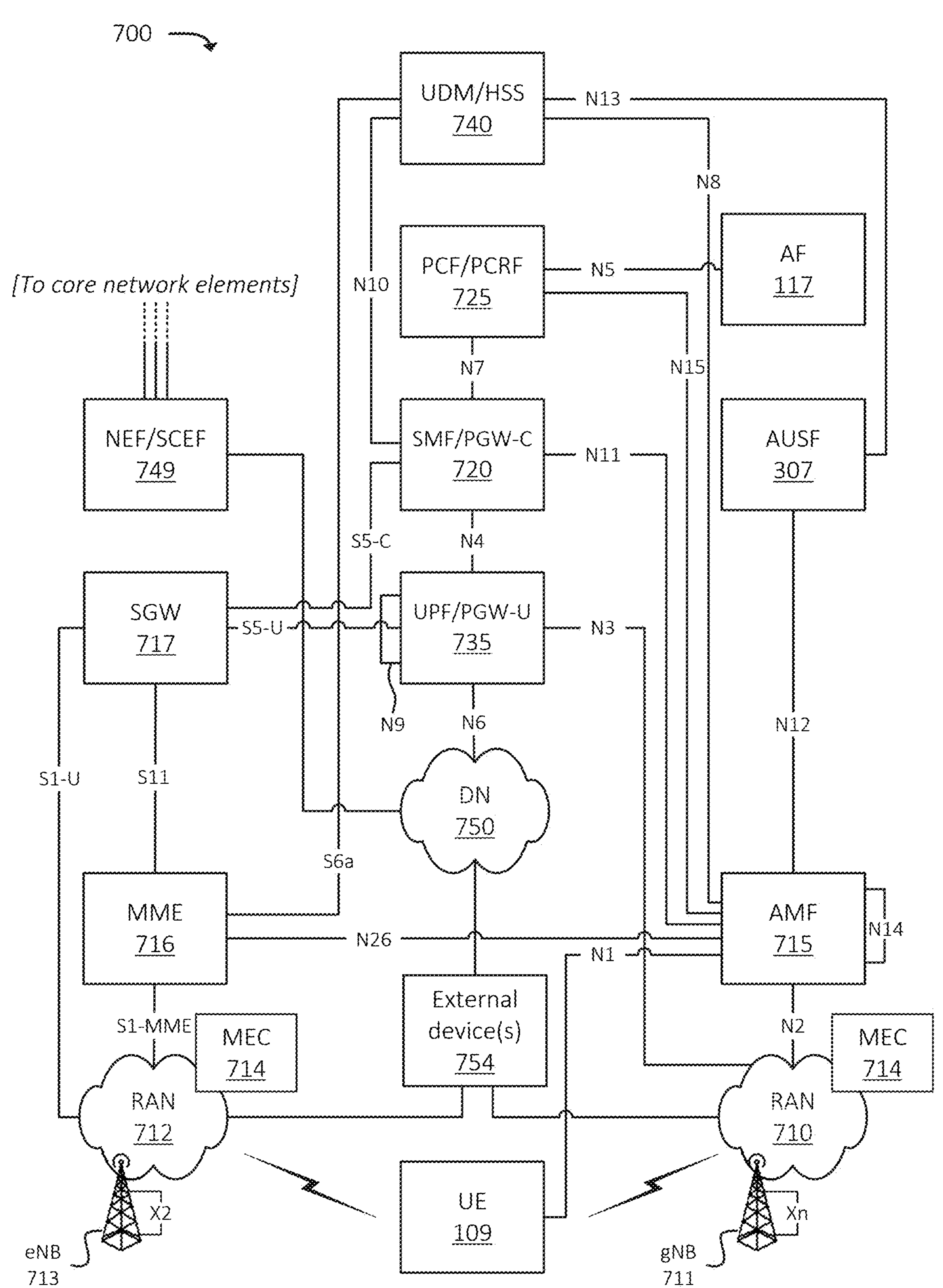
FIGS. 7 and 8 illustrate example environments in which one or more embodiments, described herein, may be implemented.

FIG. 7 illustrates an example environment 700, in which one or more embodiments may be implemented. In some embodiments, environment 700 may correspond to a 5G network, and/or may include elements of a 5G network. In some embodiments, environment 700 may correspond to a 5G Non-Standalone ("NSA") architecture, in which a 5G RAT may be used in conjunction with one or more other RATs (e.g., an LTE RAT), and/or in which elements of a 5G core network may be implemented by, may be communicatively coupled with, and/or may include elements of another type of core network (e.g., an EPC). In some embodiments, portions of environment 700 may represent or may include a 5GC. As shown, environment 700 may include UE 109, RAN 710 (which may include one or more gNBs 711), RAN 712 (which may include one or more eNBs 713), and various network functions such as Access and Mobility Management Function ("AMF") 715, Mobility Management Entity ("MME") 716, SGW 717, SMF/Packet Data Network ("PDN") Gateway ("PGW")-Control plane function ("PGW-C") 720, Policy Control Function ("PCF")/Policy Charging and Rules Function ("PCRF") 725, Application Function ("AF") 117, User Plane Function ("UPF")/PGW-User plane function ("PGW-U") 735, UDM/HSS 740, Authentication Server Function ("AUSF") 307, and Network Exposure Function ("NEF")/Service Capability Exposure Function ("SCEF") 749. Environment 700 may also include one or more networks, such as Data Network ("DN") 750. Environment 700 may include one or more additional devices or systems communicatively coupled to one or more networks (e.g., DN 750), such as one or more external devices 754. Further, in some embodiments, environment 700 may include one or more additional elements, such as ePDG 303 and/or NSWOF 305.

The example shown in FIG. 7 illustrates one instance of each network component or function (e.g., one instance of SMF/PGW-C 720, PCF/PCRF 725, UPF/PGW-U 735, UDM/HSS 740, and/or AUSF 307). In practice, environment 700 may include multiple instances of such components or functions. For example, in some embodiments, environment 700 may include multiple "slices" of a core network, where each slice includes a discrete and/or logical set of network functions (e.g., one slice may include a first instance of AMF 715, SMF/PGW-C 720, PCF/PCRF 725, and/or UPF/PGW-U 735, while another slice may include a second instance of AMF 715, SMF/PGW-C 720, PCF/PCRF 725, and/or UPF/PGW-U 735). The different slices may provide differentiated levels of service, such as service in accordance with different QoS parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. In some implementations, one or more devices of environment 700 may be physically integrated in, and/or may be physically attached to, one or more other devices of environment 700. Alternatively, or additionally, one or more of the devices of environment 700 may perform one or more network functions described as being performed by another one or more of the devices of environment 700.

Additionally, one or more elements of environment 700 may be implemented in a virtualized and/or containerized manner. For example, one or more of the elements of environment 700 may be implemented by one or more Virtualized Network Functions ("VNFs"), Cloud-Native Network Functions ("CNFs"), etc. In such embodiments, environment 700 may include, may implement, and/or may be communicatively coupled to an orchestration platform that provisions hardware resources, installs containers or applications, performs load balancing, and/or otherwise manages the deployment of such elements of environment 700. In some embodiments, such orchestration and/or management of such elements of environment 700 may be performed by, or in conjunction with, the open-source Kubernetes® application programming interface ("API") or some other suitable virtualization, containerization, and/or orchestration system.

Elements of environment 700 may interconnect with each other and/or other devices via wired connections, wireless connections, or a combination of wired and wireless connections. Examples of interfaces or communication pathways between the elements of environment 700, as shown in FIG. 7, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 7, such as Service-Based Interfaces ("SBIs"), including an Namf interface, an Nudm interface, an Npcf interface, an Nupf interface, an Nnef interface, an Nsmf interface, and/or one or more other SBIs. In some embodiments, environment 700 may be, may include, may be implemented by, and/or may be communicatively coupled to wireless core network 103.

UE 109 may include a computation and communication device, such as a wireless mobile communication device that is capable of communicating with RAN 710, RAN 712, and/or DN 750. UE 109 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a programmable logic controller or other industrial controller, a Machine-to-Machine ("M2M") device, or the like), a Fixed Wireless Access ("FWA") device, or another type of mobile computation and communication device. UE 109 may send traffic to and/or receive traffic (e.g., user plane traffic) from DN 750 via RAN 710, RAN 712, and/or UPF/PGW-U 735.

RAN 710 may be, or may include, a 5G RAN that implements a 5G RAT and that includes one or more base stations (e.g., one or more gNBs 711), via which UE 109 may communicate with one or more other elements of environment 700. UE 109 may communicate with RAN 710 via an air interface (e.g., as provided by gNB 711). For instance, RAN 710 may receive traffic (e.g., user plane traffic such as voice call traffic, data traffic, messaging traffic, etc.) from UE 109 via the air interface, and may communicate the traffic to UPF/PGW-U 735 and/or one or more other devices or networks. Further, RAN 710 may receive signaling traffic, control plane traffic, etc. from UE 109 via the air interface, and may communicate such signaling traffic, control plane traffic, etc. to AMF 715 and/or one or more other devices or networks. Additionally, RAN 710 may receive traffic intended for UE 109 (e.g., from UPF/PGW-U 735, AMF 715, and/or one or more other devices or networks) and may communicate the traffic to UE 109 via the air interface. In some embodiments, base station 115 may be, may include, and/or may be implemented by one or more gNBs 711. In some embodiments, RAN 113 may be, may include, and/or may be implemented by RAN 710.

RAN 712 may be, or may include, an LTE RAN that implements an LTE RAT and that includes one or more base stations (e.g., one or more eNBs 713), via which UE 109 may communicate with one or more other elements of environment 700. UE 109 may communicate with RAN 712 via an air interface (e.g., as provided by eNB 713). For instance, RAN 712 may receive traffic (e.g., user plane traffic such as voice call traffic, data traffic, messaging traffic, signaling traffic, etc.) from UE 109 via the air interface, and may communicate the traffic to UPF/PGW-U 735 (e.g., via SGW 717) and/or one or more other devices or networks. Further, RAN 712 may receive signaling traffic, control plane traffic, etc. from UE 109 via the air interface, and may communicate such signaling traffic, control plane traffic, etc. to MME 716 and/or one or more other devices or networks. Additionally, RAN 712 may receive traffic intended for UE 109 (e.g., from UPF/PGW-U 735, MME 716, SGW 717, and/or one or more other devices or networks) and may communicate the traffic to UE 109 via the air interface. In some embodiments, base station 115 may be, may include, and/or may be implemented by one or more eNBs 713. In some embodiments, RAN 113 may be, may include, and/or may be implemented by RAN 712.

One or more RANs of environment 700 (e.g., RAN 710 and/or RAN 712) may include, may implement, and/or may otherwise be communicatively coupled to one or more edge computing devices, such as one or more Multi-Access/Mobile Edge Computing ("MEC") devices (referred to sometimes herein simply as "MECs") 714. MECs 714 may be co-located with wireless network infrastructure equipment of RANs 710 and/or 712 (e.g., one or more gNBs 711 and/or one or more eNBs 713, respectively). Additionally, or alternatively, MECs 714 may otherwise be associated with geographical regions (e.g., coverage areas) of wireless network infrastructure equipment of RANs 710 and/or 712. In some embodiments, one or more MECs 714 may be implemented by the same set of hardware resources, the same set of devices, etc. that implement wireless network infrastructure equipment of RANs 710 and/or 712. In some embodiments, one or more MECs 714 may be implemented by different hardware resources, a different set of devices, etc. from hardware resources or devices that implement wireless network infrastructure equipment of RANs 710 and/or 712. In some embodiments, MECs 714 may be communicatively coupled to wireless network infrastructure equipment of RANs 710 and/or 712 (e.g., via a high-speed and/or low-latency link such as a physical wired interface, a high-speed and/or low-latency wireless interface, or some other suitable communication pathway).

MECs 714 may include hardware resources (e.g., configurable or provisionable hardware resources) that may be configured to provide services and/or otherwise process traffic to and/or from UE 109, via RAN 710 and/or 712. For example, RAN 710 and/or 712 may route some traffic from UE 109 (e.g., traffic associated with one or more particular services, applications, application types, etc.) to a respective MEC 714 instead of to core network elements of environment 700 (e.g., UPF/PGW-U 735). MEC 714 may accordingly provide services to UE 109 by processing such traffic, performing one or more computations based on the received traffic, and providing traffic to UE 109 via RAN 710 and/or 712. MEC 714 may include, and/or may implement, some or all of the functionality described above with respect to UPF/PGW-U 735, AF 117, one or more application servers, and/or one or more other devices, systems, VNFs, CNFs, etc. In this manner, ultra-low latency services may be provided to UE 109, as traffic does not need to traverse links (e.g., backhaul links) between RAN 710 and/or 712 and the core network.

AMF 715 may include one or more devices, systems, VNFs, CNFs, etc., that perform operations to register UE 109 with the 5G network, to establish bearer channels associated with a session with UE 109, to hand off UE 109 from the 5G network to another network, to hand off UE 109 from the other network to the 5G network, manage mobility of UE 109 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, CNFs, etc., that perform operations to register UE 109 with the EPC, to establish bearer channels associated with a session with UE 109, to hand off UE 109 from the EPC to another network, to hand off UE 109 from another network to the EPC, manage mobility of UE 109 between RANs 712 and/or eNBs 713, and/or to perform other operations.

SGW 717 may include one or more devices, systems, VNFs, CNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, CNFs, etc., that gather, process, store, and/or provide information in a manner described herein. SMF/PGW-C 720 may, for example, facilitate the establishment of communication sessions on behalf of UE 109. In some embodiments, the establishment of communications sessions may be performed in accordance with one or more policies provided by PCF/PCRF 725.

PCF/PCRF 725 may include one or more devices, systems, VNFs, CNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 117 may include one or more devices, systems, VNFs, CNFs, etc., that receive, store, and/or provide information that may be used in determining parameters (e.g., quality of service parameters, charging parameters, or the like) for certain applications.

UPF/PGW-U 735 may include one or more devices, systems, VNFs, CNFs, etc., that receive, store, and/or provide data (e.g., user plane data). For example, UPF/PGW-U 735 may receive user plane data (e.g., voice call traffic, data traffic, etc.), destined for UE 109, from DN 750, and may forward the user plane data toward UE 109 (e.g., via RAN 710, SMF/PGW-C 720, and/or one or more other devices). In some embodiments, multiple instances of UPF/PGW-U 735 may be deployed (e.g., in different geographical locations), and the delivery of content to UE 109 may be coordinated via the N9 interface (e.g., as denoted in FIG. 7 by the line marked "N9" originating and terminating at UPF/PGW-U 735). Similarly, UPF/PGW-U 735 may receive traffic from UE 109 (e.g., via RAN 710, RAN 712, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735. In some embodiments, UPF 309 may be, may include, may be implemented by, and/or may be communicatively coupled to UPF/PGW-U 735.

UDM/HSS 740 and AUSF 307 may include one or more devices, systems, VNFs, CNFs, etc., that manage, update, and/or store, in one or more memory devices associated with AUSF 307 and/or UDM/HSS 740, profile information associated with a subscriber. In some embodiments, UDM/HSS 740 may include, may implement, may be communicatively coupled to, and/or may otherwise be associated with some other type of repository or database, such as a UDR. AUSF 307 and/or UDM/HSS 740 may perform authentication, authorization, and/or accounting operations associated with one or more UEs 109 and/or one or more communication sessions associated with one or more UEs 109.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 109 may communicate, through DN 750, with data servers, other UEs 109, and/or to other servers or applications that are coupled to DN 750. DN 750 may be connected to one or more other networks, such as a PSTN, a public land mobile network ("PLMN"), and/or another network. DN 750 may be connected to one or more devices, such as content providers, applications, web servers, and/or other devices, with which UE 109 may communicate.

External devices 754 may include one or more devices or systems that communicate with UE 109 via DN 750 and one or more elements of environment 700 (e.g., via UPF/PGW-U 735). External devices 754 may include, for example, one or more application servers, content provider systems, web servers, or the like. External devices 754 may, for example, implement "server-side" applications that communicate with "client-side" applications executed by UE 109. External devices 754 may provide services to UE 109 such as gaming services, videoconferencing services, messaging services, email services, web services, and/or other types of services.

In some embodiments, external devices 754 may communicate with one or more elements of environment 700 (e.g., core network elements) via NEF/SCEF 749. NEF/SCEF 749 may include one or more devices, systems, VNFs, CNFs, etc. that provide access to information, APIs, and/or other operations or mechanisms of one or more core network elements to devices or systems that are external to the core network (e.g., to external device 754 via DN 750). NEF/SCEF 749 may maintain authorization and/or authentication information associated with such external devices or systems, such that NEF/SCEF 749 is able to provide information, that is authorized to be provided, to the external devices or systems. For example, a given external device 754 may request particular information associated with one or more core network elements. NEF/SCEF 749 may authenticate the request and/or otherwise verify that external device 754 is authorized to receive the information, and may request, obtain, or otherwise receive the information from the one or more core network elements. In some embodiments, NEF/SCEF 749 may include, may implement, may be implemented by, may be communicatively coupled to, and/or may otherwise be associated with a Security Edge Protection Proxy ("SEPP"), which may perform some or all of the functions discussed above. External device 754 may, in some situations, subscribe to particular types of requested information provided by the one or more core network elements, and the one or more core network elements may provide (e.g., "push") the requested information to NEF/SCEF 749 (e.g., in a periodic or otherwise ongoing basis).

In some embodiments, external devices 754 may communicate with one or more elements of RAN 710 and/or 712 via an API or other suitable interface. For example, a given external device 754 may provide instructions, requests, etc. to RAN 710 and/or 712 to provide one or more services via one or more respective MECs 714. In some embodiments, such instructions, requests, etc. may include QoS parameters, Service Level Agreements ("SLAs"), etc. (e.g., maximum latency thresholds, minimum throughput thresholds, etc.) associated with the services.

Figure 8:
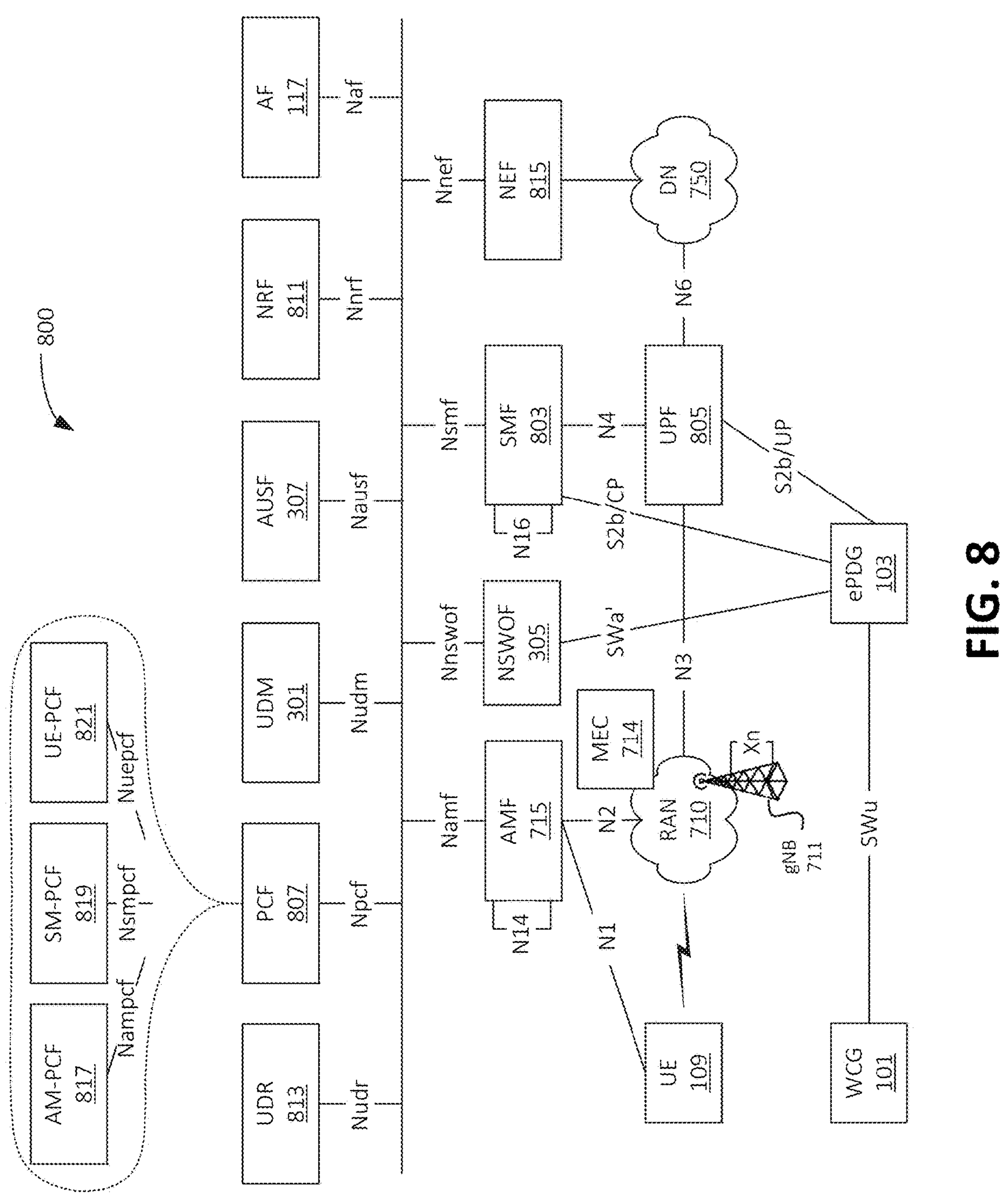

FIG. 8 illustrates another example environment 800, in which one or more embodiments may be implemented. In some embodiments, environment 800 may correspond to a 5G network, and/or may include elements of a 5G network. In some embodiments, environment 800 may correspond to a 5G SA architecture. In some embodiments, environment 800 may include a 5GC, in which 5GC network elements perform one or more operations described herein.

As shown, environment 800 may include UE 109, RAN 710 (which may include one or more gNBs 711 or other types of wireless network infrastructure) and various network functions, which may be implemented as VNFs, CNFs, etc. Such network functions may include AMF 715, SMF 803, UPF 805, PCF 807, UDM 301, AUSF 307, Network Repository Function ("NRF") 811, AF 117, UDR 813, and NEF 815. Environment 800 may also include or may be communicatively coupled to one or more networks, such as DN 750.

The example shown in FIG. 8 illustrates one instance of each network component or function (e.g., one instance of SMF 803, UPF 805, PCF 807, UDM 301, AUSF 307, etc.). In practice, environment 800 may include multiple instances of such components or functions. For example, in some embodiments, environment 800 may include multiple "slices" of a core network, where each slice includes a discrete and/or logical set of network functions (e.g., one slice may include a first instance of SMF 803, PCF 807, UPF 805, etc., while another slice may include a second instance of SMF 803, PCF 807, UPF 805, etc.). Additionally, or alternatively, one or more of the network functions of environment 800 may implement multiple network slices. The different slices may provide differentiated levels of service, such as service in accordance with different QoS parameters.

The quantity of devices and/or networks, illustrated in FIG. 8, is provided for explanatory purposes only. In practice, environment 800 may include additional devices and/or networks, fewer devices and/or networks, different devices and/or networks, or differently arranged devices and/or networks than illustrated in FIG. 8. For example, while not shown, environment 800 may include devices that facilitate or enable communication between various components shown in environment 800, such as routers, modems, gateways, switches, hubs, etc. In some implementations, one or more devices of environment 800 may be physically integrated in, and/or may be physically attached to, one or more other devices of environment 800. Alternatively, or additionally, one or more of the devices of environment 800 may perform one or more network functions described as being performed by another one or more of the devices of environment 800.

Elements of environment 800 may interconnect with each other and/or other devices via wired connections, wireless connections, or a combination of wired and wireless connections. Examples of interfaces or communication pathways between the elements of environment 800, as shown in FIG. 8, may include interfaces shown in FIG. 8 and/or one or more interfaces not explicitly shown in FIG. 8. These interfaces may include interfaces between specific network functions, such as an N1 interface, an N2 interface, an N3 interface, an N6 interface, an N9 interface, an N14 interface, an N16 interface, and/or one or more other interfaces. In some embodiments, one or more elements of environment 800 may communicate via a service-based architecture ("SBA"), in which a routing mesh or other suitable routing mechanism may route communications to particular network functions based on interfaces or identifiers associated with such network functions. Such interfaces may include or may be referred to as SBIs, including an Namf interface (e.g., indicating communications to be routed to AMF 715), an Nudm interface (e.g., indicating communications to be routed to UDM 301), an Npcf interface, an Nupf interface, an Nnef interface, an Nsmf interface, an Nnrf interface, an Nudr interface, an Naf interface, an Nnswof interface, and/or one or more other SBIs. In some embodiments, environment 800 may be, may include, may be implemented by, and/or may be communicatively coupled to wireless core network 103.

UPF 805 may include one or more devices, systems, VNFs, CNFs, etc., that receive, route, process, and/or forward traffic (e.g., user plane traffic). As discussed above, UPF 805 may communicate with UE 109 via one or more communication sessions, such as PDU sessions. Such PDU sessions may be associated with a particular network slice or other suitable QoS parameters, as noted above. UPF 805 may receive downlink user plane traffic (e.g., voice call traffic, data traffic, etc. destined for UE 109) from DN 750, and may forward the downlink user plane traffic toward UE 109 (e.g., via RAN 710). In some embodiments, multiple UPFs 805 may be deployed (e.g., in different geographical locations), and the delivery of content to UE 109 may be coordinated via the N9 interface. Similarly, UPF 805 may receive uplink traffic from UE 109 (e.g., via RAN 710), and may forward the traffic toward DN 750. In some embodiments, UPF 805 may implement, may be implemented by, may be communicatively coupled to, and/or may otherwise be associated with UPF/PGW-U 735. In some embodiments, UPF 805 may communicate (e.g., via the N4 interface) with SMF 803, regarding user plane data processed by UPF 805 (e.g., to provide analytics or reporting information, to receive policy and/or authorization information, etc.).

PCF 807 may include one or more devices, systems, VNFs, CNFs, etc., that aggregate, derive, generate, etc. policy information associated with the 5GC and/or UEs 109 that communicate via the 5GC and/or RAN 710. PCF 807 may receive information regarding policies and/or subscriptions from one or more sources, such as subscriber databases (e.g., UDM 301, UDR 813, etc.), and/or from one or more users such as, for example, an administrator associated with PCF 807. In some embodiments, the functionality of PCF 807 may be split into multiple network functions or subsystems, such as access and mobility PCF ("AM-PCF") 817, session management PCF ("SM-PCF") 819, UE PCF ("UE-PCF") 821, and so on. Such different "split" PCFs may be associated with respective SBIs (e.g., AM-PCF 817 may be associated with an Nampcf SBI, SM-PCF 819 may be associated with an Nsmpcf SBI, UE-PCF 821 may be associated with an Nuepcf SBI, and so on) via which other network functions may communicate with the split PCFs. The split PCFs may maintain information regarding policies associated with different devices, systems, and/or network functions.

NRF 811 may include one or more devices, systems, VNFs, CNFs, etc. that maintain routing and/or network topology information associated with the 5GC. For example, NRF 811 may maintain and/or provide IP addresses of one or more network functions, routes associated with one or more network functions, discovery and/or mapping information associated with particular network functions or network function instances (e.g., whereby such discovery and/or mapping information may facilitate the SBA), and/or other suitable information.

UDR 813 may include one or more devices, systems, VNFs, CNFs, etc. that provide user and/or subscriber information, based on which PCF 807 and/or other elements of environment 800 may determine access policies, QoS policies, charging policies, or the like. In some embodiments, UDR 813 may receive such information from UDM 301 and/or one or more other sources.

NEF 815 may include one or more devices, systems, VNFs, CNFs, etc. that provide access to information, APIs, and/or other operations or mechanisms of the 5GC to devices or systems that are external to the 5GC. NEF 815 may maintain authorization and/or authentication information associated with such external devices or systems, such that NEF 815 is able to provide information, that is authorized to be provided, to the external devices or systems. Such information may be received from other network functions of the 5GC (e.g., as authorized by an administrator or other suitable entity associated with the 5GC), such as SMF 803, UPF 805, a charging function ("CHF") of the 5GC, and/or other suitable network function. NEF 815 may communicate with external devices or systems (e.g., external devices 754) via DN 750 and/or other suitable communication pathways.

While environment 800 is described in the context of a 5GC, as noted above, environment 800 may, in some embodiments, include or implement one or more other types of core networks. For example, in some embodiments, environment 800 may be or may include a converged packet core, in which one or more elements may perform some or all of the functionality of one or more 5GC network functions and/or one or more EPC network functions. For example, in some embodiments, AMF 715 may include, may implement, may be implemented by, and/or may otherwise be associated with MME 716; SMF 803 may include, may implement, may be implemented by, and/or may otherwise be associated with SGW 717; PCF 807 may include, may implement, may be implemented by, and/or may otherwise be associated with a PCRF (e.g., PCF/PCRF 725); NEF 815 may include, may implement, may be implemented by, and/or may otherwise be associated with a SCEF (e.g., NEF/SCEF 749); and so on.

Figure 9:
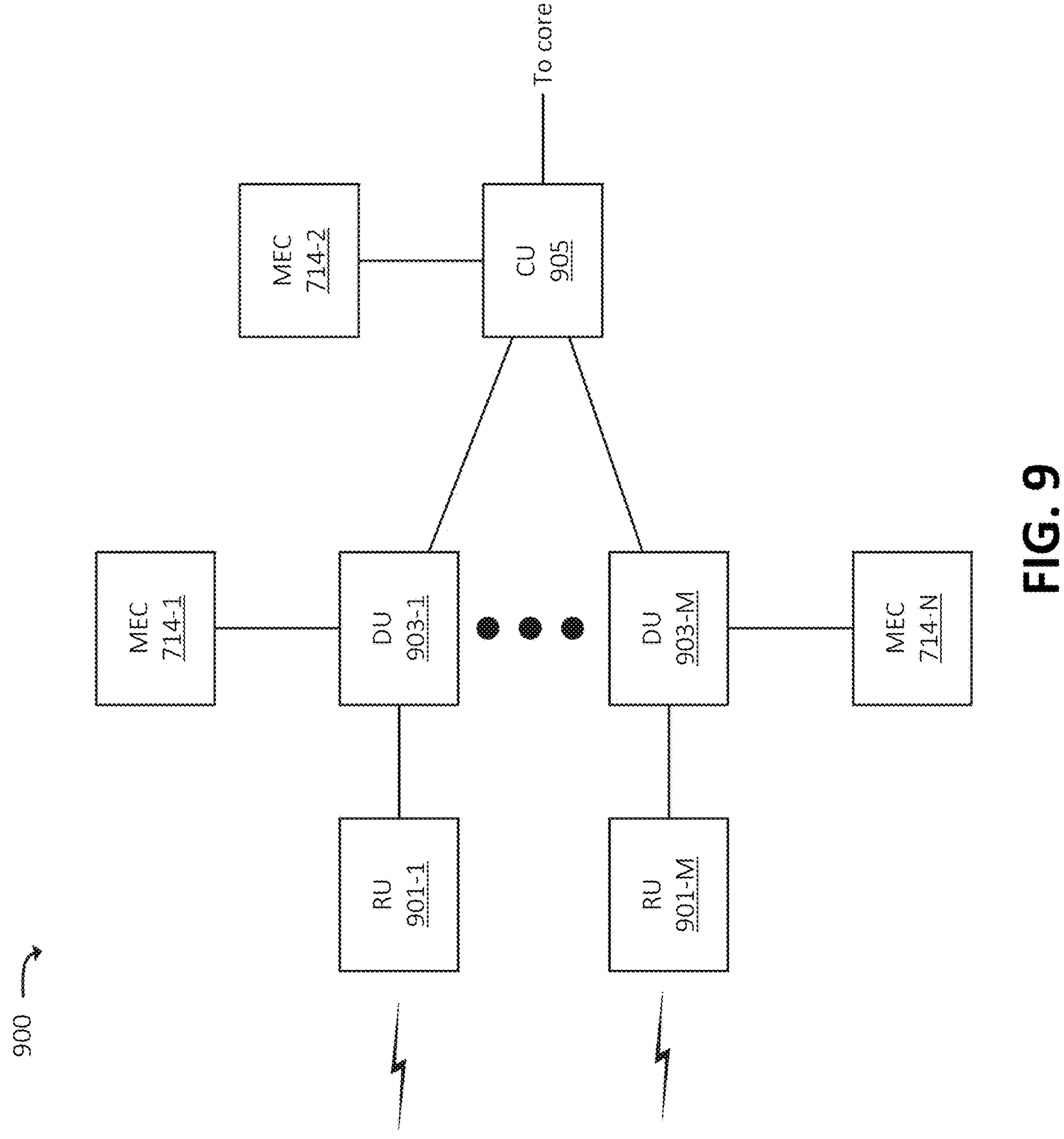
FIG. 9 illustrates an example arrangement of a radio access network ("RAN"), in accordance with some embodiments.

FIG. 9 illustrates an example RAN environment 900, which may be included in and/or implemented by one or more RANs (e.g., RAN 710 or some other RAN). In some embodiments, a particular RAN 710 may include one RAN environment 900. In some embodiments, a particular RAN 710 may include multiple RAN environments 900. In some embodiments, RAN environment 900 may correspond to a particular gNB 711 of RAN 710. In some embodiments, RAN environment 900 may correspond to multiple gNBs 711. In some embodiments, RAN environment 900 may correspond to one or more other types of base stations of one or more other types of RANs. As shown, RAN environment 900 may include Central Unit ("CU") 905, one or more Distributed Units ("DUs") 903-1 through 903-M (referred to individually as "DU 903," or collectively as "DUs 903"), and one or more Radio Units ("RUs") 901-1 through 901-M (referred to individually as "RU 901," or collectively as "RUs 901").

CU 905 may communicate with a core of a wireless network (e.g., may communicate with one or more of the devices or systems described above with respect to FIG. 8, such as AMF 715 and/or UPF 805) and/or some other device or system such as MEC 714. In the uplink direction (e.g., for traffic from UEs 109 to a core network), CU 905 may aggregate traffic from DUs 903, and forward the aggregated traffic to the core network. In some embodiments, CU 905 may receive traffic according to a given protocol (e.g., Radio Link Control ("RLC") traffic) from DUs 903, and may perform higher-layer processing (e.g., may aggregate/process RLC packets and generate Packet Data Convergence Protocol ("PDCP") packets based on the RLC packets) on the traffic received from DUs 903.

CU 905 may receive downlink traffic (e.g., traffic from the core network, traffic from a given MEC 714, etc.) for a particular UE 109, and may determine which DU(s) 903 should receive the downlink traffic. DU 903 may include one or more devices that transmit traffic between a core network (e.g., via CU 905) and UE 109 (e.g., via a respective RU 901). DU 903 may, for example, receive traffic from RU 901 at a first layer (e.g., physical ("PHY") layer traffic, or lower PHY layer traffic), and may process/aggregate the traffic to a second layer (e.g., upper PHY and/or RLC). DU 903 may receive traffic from CU 905 at the second layer, may process the traffic to the first layer, and provide the processed traffic to a respective RU 901 for transmission to UE 109.

RU 901 may include hardware circuitry (e.g., one or more RF transceivers, antennas, radios, and/or other suitable hardware) to communicate wirelessly (e.g., via an RF interface) with one or more UEs 109, one or more other DUs 903 (e.g., via RUs 901 associated with DUs 903), and/or any other suitable type of device. In the uplink direction, RU 901 may receive traffic from UE 109 and/or another DU 903 via the RF interface and may provide the traffic to DU 903. In the downlink direction, RU 901 may receive traffic from DU 903, and may provide the traffic to UE 109 and/or another DU 903.

One or more elements of RAN environment 900 may, in some embodiments, be communicatively coupled to one or more MECs 714. For example, DU 903-1 may be communicatively coupled to MEC 714-1, DU 903-M may be communicatively coupled to MEC 714 -N, CU 905 may be communicatively coupled to MEC 714-2, and so on. MECs 714 may include hardware resources (e.g., configurable or provisionable hardware resources) that may be configured to provide services and/or otherwise process traffic to and/or from UE 109, via a respective RU 901.

For example, DU 903-1 may route some traffic, from UE 109, to MEC 714-1 instead of to a core network via CU 905. MEC 714-1 may process the traffic, perform one or more computations based on the received traffic, and may provide traffic to UE 109 via RU 901-1. As discussed above, MEC 714 may include, and/or may implement, some or all of the functionality described above with respect to UPF 805, AF 117, and/or one or more other devices, systems, VNFs, CNFs, etc. In this manner, ultra-low latency services may be provided to UE 109, as traffic does not need to traverse DU 903, CU 905, links between DU 903 and CU 905, and an intervening backhaul network between RAN environment 900 and the core network.

Figure 10:
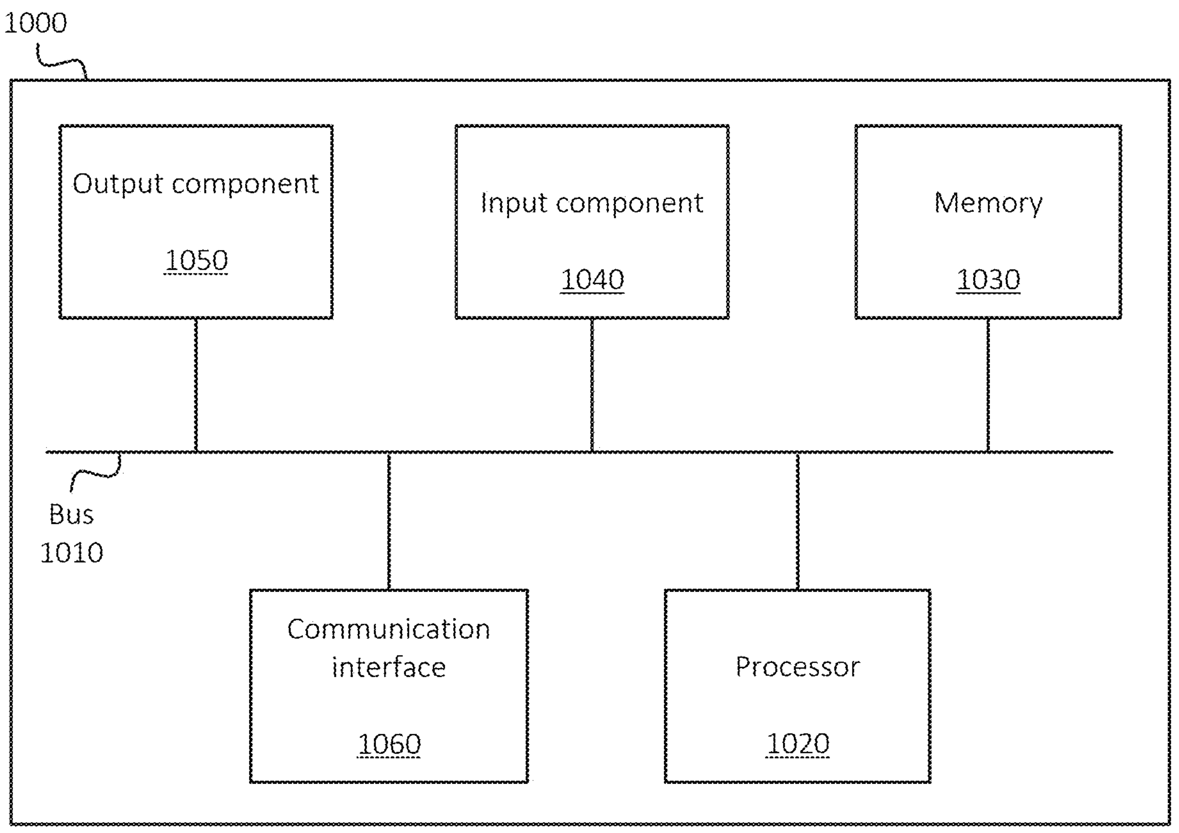
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, a set of provisioned hardware resources of a cloud computing system, or other suitable type of hardware that interprets and/or executes instructions (e.g., processor-executable instructions). In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or otherwise receives or detects input from a source external to input component 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems (e.g., via RAN 710, RAN 712, DN 750, etc.). For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a cellular radio, a remote control, a wireless keyboard, a mobile telephone, etc. In some embodiments, device 1000 may include more than one communication interface 1060. For instance, device 1000 may include an optical interface, a wireless interface, an Ethernet interface, and/or one or more other interfaces.

Device 1000 may perform certain operations relating to one or more processes described above. Device 1000 may perform these operations in response to processor 1020 executing instructions, such as software instructions, processor-executable instructions, etc. stored in a computer-readable medium, such as memory 1030. A computer-readable medium may be defined as a non-transitory memory device. A memory device may include space within a single physical memory device or spread across multiple physical memory devices. The instructions may be read into memory 1030 from another computer-readable medium or from another device. The instructions stored in memory 1030 may be processor-executable instructions that cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:

a plurality of physical interfaces; and one or more processors configured to:

request access to a wireless core network, wherein requesting the access includes providing one or more network-provided identifiers of the device to the wireless core network;

receive, based on the request for access, access to the wireless core network;

identify a particular endpoint associated with a particular physical interface of the plurality of physical interfaces;

request, based on receiving access to the wireless core network, a communication session with the particular endpoint via the wireless core network;

receive, via the particular physical interface, a first plurality of analog signals;

generate first Internet Protocol ("IP") traffic based on the first plurality of analog signals received via the particular physical interface;

output the first IP traffic to the particular endpoint via the wireless core network;

receive second IP traffic from the particular endpoint via the wireless core network;

generate a second plurality of analog signals based on the second IP traffic received from the particular endpoint via the wireless core network; and output the second plurality of analog signals via the particular physical interface.

2. The device of claim 1, wherein the particular physical interface includes a non-IP port.

3. The device of claim 2, wherein the non-IP port includes a Registered Jack 11 ("RJ11") jack.

4. The device of claim 1, wherein generating the first IP traffic includes performing an analog-to-digital conversion operation on the first plurality of analog signals received via the particular physical interface, and wherein generating the second plurality of analog signals includes performing a digital-to-analog conversion operation on the second IP traffic received from the particular endpoint via the wireless core network.

5. The device of claim 1, wherein the wireless core network is communicatively coupled to a radio access network ("RAN") that implements a wireless interface that facilitates connectivity between one or more User Equipment ("UEs") and the wireless core network.

6. The device of claim 1, wherein requesting access to the wireless core network includes outputting one or more messages to an Evolved Packet Data Gateway ("ePDG") of the wireless core network.

7. The device of claim 6, wherein the ePDG communicates with a Non-Seamless Wireless Local Area Network Offload Function ("NSWOF") as part of an authentication or authorization procedure that is performed based on the request to access the wireless core network.

8. A non-transitory computer-readable medium, storing a plurality of processor-executable instructions to:

request access to a wireless core network, wherein requesting the access includes providing one or more network-provided identifiers of a device to the wireless core network;

receive, based on the request for access, access to the wireless core network;

identify a particular endpoint associated with a particular physical interface, of a plurality of physical interfaces of the device;

request, based on receiving access to the wireless core network, a communication session with the particular endpoint via the wireless core network;

receive, via the particular physical interface, a first plurality of analog signals;

generate first Internet Protocol ("IP") traffic based on the first plurality of analog signals received via the particular physical interface;

output the first IP traffic to the particular endpoint via the wireless core network;

receive second IP traffic from the particular endpoint via the wireless core network;

generate a second plurality of analog signals based on the second IP traffic received from the particular endpoint via the wireless core network; and output the second plurality of analog signals via the particular physical interface.

9. The non-transitory computer-readable medium of claim 8, wherein the particular physical interface includes a non-IP port.

10. The non-transitory computer-readable medium of claim 9, wherein the non-IP port includes a Registered Jack 11 ("RJ11") jack.

11. The non-transitory computer-readable medium of claim 8, wherein generating the first IP traffic includes performing an analog-to-digital conversion operation on the first plurality of analog signals received via the particular physical interface, and wherein generating the second plurality of analog signals includes performing a digital-to-analog conversion operation on the second IP traffic received from the particular endpoint via the wireless core network.

12. The non-transitory computer-readable medium of claim 8, wherein the wireless core network is communicatively coupled to a radio access network ("RAN") that implements a wireless interface that facilitates connectivity between one or more User Equipment ("UEs") and the wireless core network.

13. The non-transitory computer-readable medium of claim 8, wherein requesting access to the wireless core network includes outputting one or more messages to an Evolved Packet Data Gateway ("ePDG") of the wireless core network.

14. The non-transitory computer-readable medium of claim 13, wherein the ePDG communicates with a Non-Seamless Wireless Local Area Network Offload Function ("NSWOF") as part of an authentication or authorization procedure that is performed based on the request to access the wireless core network.

15. A method, comprising:

requesting access to a wireless core network, wherein requesting the access includes providing one or more network-provided identifiers of a device to the wireless core network;

receiving, based on the request for access, access to the wireless core network;

identifying a particular endpoint associated with a particular physical interface of a plurality of physical interfaces of the device;

requesting, based on receiving access to the wireless core network, a communication session with the particular endpoint via the wireless core network;

receiving, via the particular physical interface, a first plurality of analog signals;

generating first Internet Protocol ("IP") traffic based on the first plurality of analog signals received via the particular physical interface;

outputting the first IP traffic to the particular endpoint via the wireless core network;

receiving second IP traffic from the particular endpoint via the wireless core network;

generating a second plurality of analog signals based on the second IP traffic received from the particular endpoint via the wireless core network; and outputting the second plurality of analog signals via the particular physical interface.

16. The method of claim 15, wherein the particular physical interface includes a Registered Jack 11 ("RJ11") jack.

17. The method of claim 15, wherein generating the first IP traffic includes performing an analog-to-digital conversion operation on the first plurality of analog signals received via the particular physical interface, and wherein generating the second plurality of analog signals includes performing a digital-to-analog conversion operation on the second IP traffic received from the particular endpoint via the wireless core network.

18. The method of claim 15, wherein the wireless core network is communicatively coupled to a radio access network ("RAN") that implements a wireless interface that facilitates connectivity between one or more User Equipment ("UEs") and the wireless core network.

19. The method of claim 15, wherein requesting access to the wireless core network includes outputting one or more messages to an Evolved Packet Data Gateway ("ePDG") of the wireless core network.

20. The method of claim 19, wherein the ePDG communicates with a Non-Seamless Wireless Local Area Network Offload Function ("NSWOF") as part of an authentication or authorization procedure that is performed based on the request to access the wireless core network.

* * * * *